United States Patent [19]

Shimada et al.

[11] 4,355,681
[45] Oct. 26, 1982

[54] SYSTEM FOR CONTROLLING A VEHICLE MOUNTED AIR CONDITIONER

[75] Inventors: Yukio Shimada; Naoyoshi Suzuki; Toshio Ohashi, all of Yokohama; Yasushi Inoshita, Tokyo, all of Japan

[73] Assignee: Nissan Motor Co., Ltd., Yokohama, Japan

[21] Appl. No.: 206,271

[22] Filed: Nov. 12, 1980

[30] Foreign Application Priority Data

Nov. 15, 1979 [JP] Japan ................................ 54-147067

[51] Int. Cl.³ ........................................... F25B 29/00
[52] U.S. Cl. ........................................ 165/16; 165/25; 236/13
[58] Field of Search ........................... 236/13, 49, 82; 237/12.3 A; 165/16, 25; 251/26

[56] References Cited

U.S. PATENT DOCUMENTS

| 3,428,115 | 2/1969 | Caldwell | 236/13 X |
| 3,983,930 | 10/1976 | Franz | 236/13 X |
| 4,037,651 | 7/1977 | Ito et al. | 236/82 X |
| 4,134,542 | 1/1979 | Sugiura | 236/13 |
| 4,262,738 | 4/1981 | Kato et al. | 165/25 |
| 4,271,897 | 6/1981 | Tatemoto | 165/25 X |

Primary Examiner—William E. Tapolcai
Attorney, Agent, or Firm—Lane, Aitken, Kice & Kananen

[57] ABSTRACT

A vehicle mounted air conditioner controlling system is disclosed and of which system comprises a vacuum mode controlling switch (41) being controlled by depression of push-button switches (56) for each mode and mounted on a controller, a shift actuator (43) and vacuum selectors (42, 42'). The system is controlled by uni-directional vacuum signal and blower outlet doors and the air intake door are controlled by respective actuator provided individually therefor.

4 Claims, 7 Drawing Figures

PRIOR ART  FIG.2

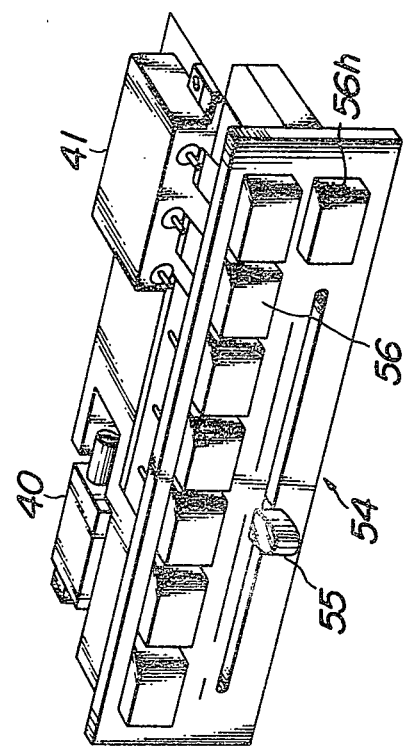

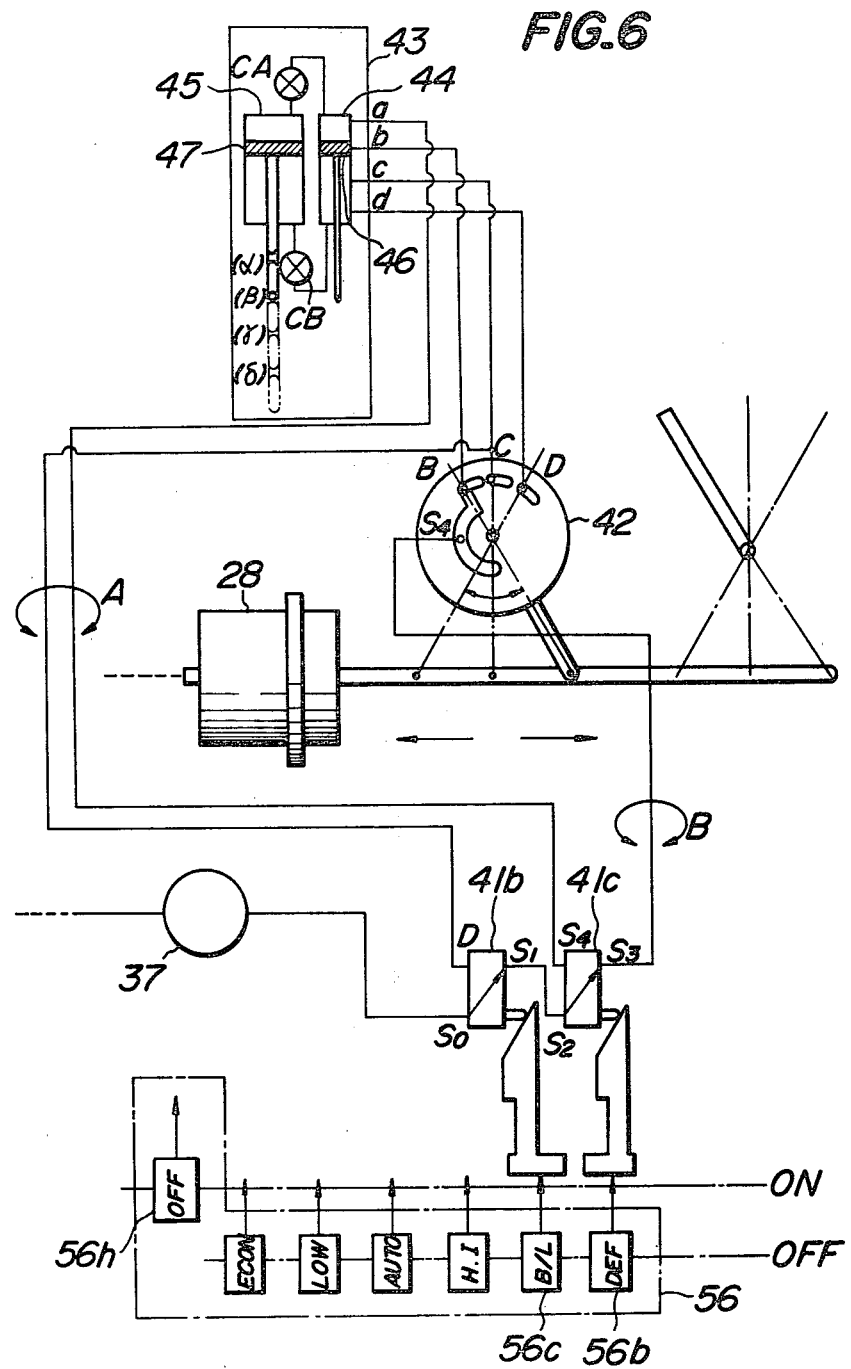

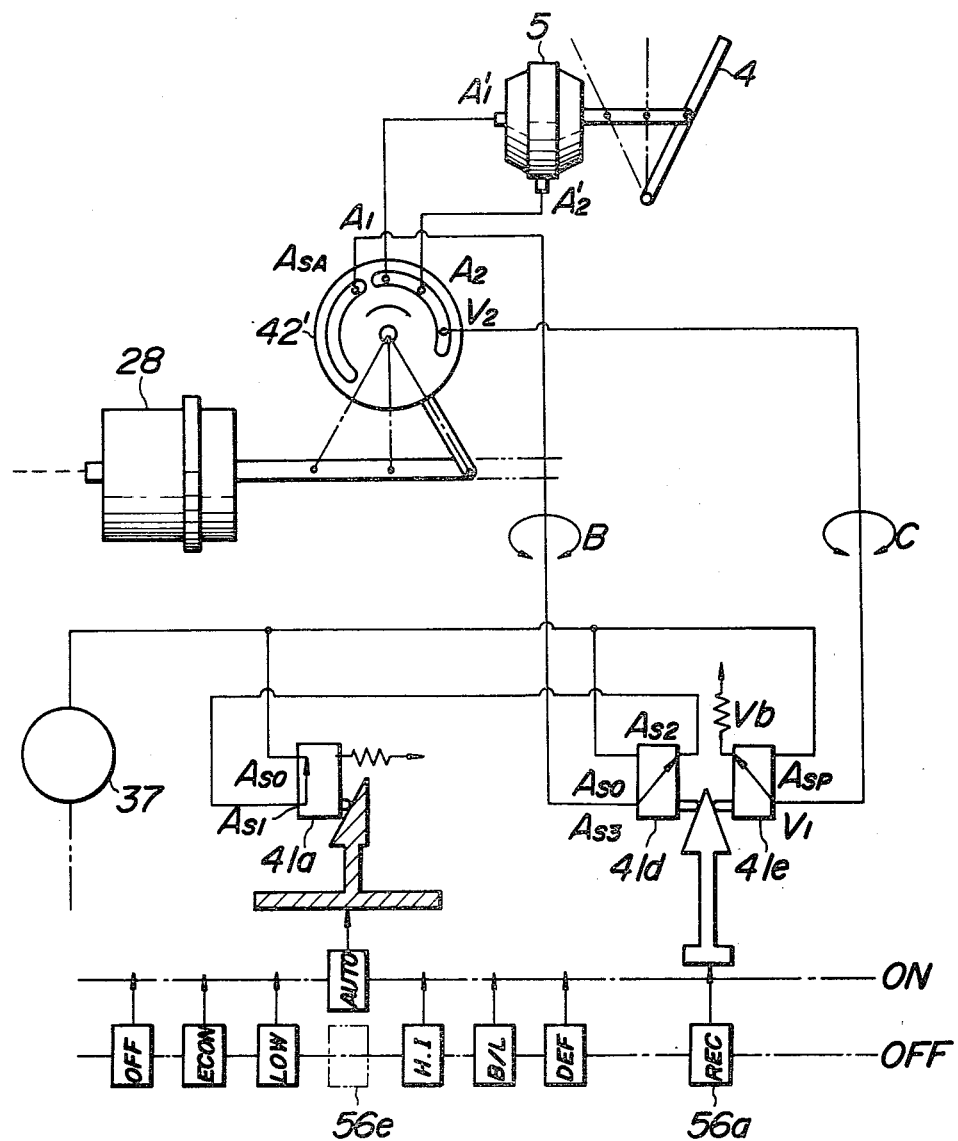

SYSTEM FOR CONTROLLING A VEHICLE MOUNTED AIR CONDITIONER

BACKGROUND OF THE INVENTION

The present invention relates to a system for controlling the air conditioner of a vehicle, and more particularly to an improvement of the vacuum controlling signal system for controlling doors at the blower outlets and the air inlets for introducing outer air and/or cabin air.

An air conditioner of a vehicle generally comprises various blower outlets for blowing out conditioned or adjusted air in response to the degree of opening of the air mixing door, such as an instrument blower outlet, a defroster blower outlet, and a floor blower outlet, and an intake port for introducing outer air or cabin air for the recirculation. Switching and controlling of the various doors are made by a mode selecting device of the air conditioner provided in the middle of the front of the instrument panel. Switching and the open or close controlling of the abovementioned various doors are automatically controlled based on a program for temperature adjusting, this is true especially this is true in a fully automatic air conditioner.

An example of such a conventional automatic control system of a vehicle mounted air conditioner is shown in FIG. 1. The device comprises an air intake door 4 for selecting either the outer air or the inner or cabin air at an intake duct portion 3, where a cabin air intake port 1 and an outer air intake port 2 are jointly coupled. This air intake door 4 is driven by an intake door actuator 5. Downstream of said intake duct portion 3, a fan 6 is provided, which acts to blow the air introduced either through the cabin air intake port 1 or the outer air intake port 2 through an evaporator 7. Downstream of the evaporator 7, an air mixing door 11 for selecting either a hot air passage 9 or a cold air passage 10 is provided. This air mixing door 11 is controlled by a power servo 12 and, by its selection, the air passed through the evaporator 7 is fed either to the hot air passage 9 and to a heater core 8 or to the cold air passage 10, which is a detour not passing the heater core 8. Downstream of the hot air passage 9 and the cold air passage 10, there is provided an air mixing chamber 13. At the downstream side of the air mixing chamber 13, there are provided branched passageways, one leading to a defroster blower outlet 15 and one leading to a floor blower outlet 16. In the passageways, a by-passing door 17, a ventilator door 18 and a floor door 19 are provided, respectively. These doors are respectively actuated by a by-pass door actuator 20, a ventilator door actuator 21, and a floor door actuator 22 provided individually for each one of the doors.

A circuit construction of the automatic controlling device in the above air conditioner will be explained by referring to FIG. 2. The automatic controlling circuit is formed of a vacuum signalling system, an electric signalling system and also of mechanical couplings connecting various elements. In the figure, a full or solid line indicates the vacuum signalling system, a one point dash-dot line indicates the electric signalling system and a dotted line indicates the mechanical coupling. The signal transmission will be explained by referring to both the FIGS. 1 and 2. An automatic air conditioner controller 23 mounted at a lower side of the front middle portion of the instrument panel (not shown) has two controlling levers. The bottom lever is the temperature control lever 24 and the blowing out temperature can be adjusted by this lever 24. By moving this temperature control lever 24, a composite resistance is adjusted. Said composite resistance is formed of a series connection of a resistance of a temperature potentiometer (not shown), a cabin air temperature sensor (not shown) provided, for instance, on the upper surface of the instrument or the like, and an outer air temperature sensor, also not shown in the drawing, and provided, for instance, on an inner side of the front bumper. The resistance value of the composite resistance is transmitted to an input of a differential amplifier 26, which is an electronic controlling circuit, as a temperature signal input. An output current therefrom having a value corresponding to said composite resistance of the designated temperature set by the temperature control lever 24, and by the variation of the temperature of the cabin air and that of the outer air detected by the respective sensors is applied to a transducer 27. This transducer 27 converts the output current of the differential amplifier 26 into a negative pressure signal and delivers it to a power servo 12. The power servo 12 receives the negative pressure as a displacement and varies the openings of the air mixing door 11 so as to adjust the temperature of the air blowing out and to keep the cabin air at a settled and almost constant temperature.

The upper lever of the automatic air conditioner controller 23 is the air control lever 29, which is to be used for selecting a desired controlling mode. This air control lever 29 is coupled to a vacuum selector 30. As shown in FIG. 1, this vacuum selector 30 has two drum shaped cylinders 31 and 32 connected to each other to form a unit. The lower cylinder 31 is fixed to said air control lever 29 and has on its upper surface a number of communicating holes 33 through which the vacuum pressure fed through tap 34 is supplied to the upper cylinder 32. On the bottom surface of the upper cylinder 32, a number of recesses 35 are provided. Coincidence between the communicating holes 33 and the recesses 35 by the control of the air control lever 29 causes the vacuum pressure to be supplied to various actuators 5, 20, 21 and 22 through respective taps 36a, 36b, 36c, 36d, 36e, 36f and 36g. The vacuum pressure has its source, for instance, at the negative pressure in the engine manifold. The negative pressure source or the vacuum source 37 is connected to a vacuum program switch 38 and to the vacuum selector 30 through two piping circuits. The vacuum program switch 38 and the upper cylinder 32 of the vacuum selector 30 are coupled through three piping circuits. It should be noted that the upper and lower cylinders 32 and 31 of the vacuum selector 30 are shown separated from each other, but this is just for explanatory purposes.

The degree of opening of the air mixing door 11 is automatically controlled by setting a desired temperature by the temperature control lever 24, as has been explained in the foregoing. The vacuum program switch 38 operates in response to said degree of opening of the air mixing door 11 either in the clockwise direction or the counterclockwise direction and supplies vacuum through said three circuits even if no manual mode selection is made. The supplied vacuum is fed to the intake door actuator 5, to the by-pass door actuator 20, to the ventilator door actuator 21 and to the floor door actuator 22 through the vacuum selector 30 and actuates the respective device. When a particular mode is desired, the air control lever 29 should be moved to a desired position and, by the orientation of the air control lever 29 with respect to the vacuum selector 30 coupled thereto, a basic vacuum circuit is decided. Further piping systems other than above will be explained. Between the vacuum selector 30 and the intake door actuator 5 actuating the air intake door 4 arranged at the intake duct portion 3 to open or to close, there are provided two piping circuits coupling the vacuum selector 30 and the intake door actuator 5. If the vacuum is supplied to one of the piping circuits, the air intake door is half opened and the other piping circuit is coupled to the open air. When the vacuum is supplied simultaneously to both piping circuits, the intake door 4 introduces only outer air. However, when vacuum is supplied to neither piping circuit, the air intake door 4 permits only the recirculation of cabin air.

The vacuum circuit further comprises a 3-way electromagnetic valve 39, which can be actuated by turning off the main electric switch (not shown) having its supply source from the battery (not shown), even when vacuum is supplied and the air intake door 4 is set at the outer air introducing condition. By the actuation of the electromagnetic valve 39, the vacuum supply fed from the taps 36f and 36g of the vacuum selector 30 to the intake door actuator 5 is interrupted, and at the same time the intake door actuator 5 is placed in communication with the open air through the electromagnetic valve 39, so as to cause a non-pressure condition in the two piping systems and to move the air intake door 4 to a fixed position for the cabin air recirculation condition. By switching on the main electric switch, the vacuum will be supplied from the vacuum selector 30 again. The vacuum selector 30 is coupled to the floor door actuator 22 and the ventilator door actuator 21 via two piping systems respectively. In the same manner with the aforementioned two piping systems coupled to the intake door actuator 5, the floor door actuator 22 and the ventilator door actuator 21 are operated by the supply of the vacuum or removal thereof to switch the floor door 19 and the ventilator door 18 to place them in the positions of open, half open and closed to blow air out from the floor blower outlet 16 and from the instrument blower outlet 15. The vacuum selector 30 and the by-pass door actuator 20 are coupled by one piping system, and the by-pass door actuator 20 may be actuated or released by the supply of vacuum or discontinuation of the same to cause the by-pass door 17 to be opened or closed.

Such a conventional automatic controlling device for the vehicle mounted air conditioner has a drawback in that the operational steps of the actuators 5, 20, 21 and 22 for actuating doors 4, 17, 18 and 19 for controlling the air blower outlets 14, 15, 16 and inlets 1 and 2 to bring the respective doors at predetermined position are too complicated. The doors 4, 17, 18 and 19 return to home positions only by releasing the vacuum supplied to the actuators 5, 20, 21 and 22 to the open air, so that the pressure signal must be bi-directional since both the supply of vacuum and evacuation of the same are required. The vacuum signalling system used for controlling the reciprocated signal thus becomes complicated and the number of vacuum piping systems also becomes large. This results in a requirement for a large space for accommodating the same which is inevitably accompanied by a high manufacturing cost.

Furthermore, the mode selection is required both under the automatic control and the manual control, and hence, for the vacuum signal transmission between the vacuum selector 30 for selecting the mode and the vacuum program switch 38 for automatic mode selection, the same condition exists, as has been explained, and this will also result in a complicated signalling system. Especially the program for vacuum communication and evacuation inside the vacuum selector 30 becomes very complicated, and the system is not suited for use in the case of synchronous control for the number of doors 4, 17, 18 and 19.

For fixing the air intake door 4 at the cabin air recirculation position, an electromagnetic valve 39 is provided for the purpose of controlling the same. However, such a separate provision of the electric signalling system including the electric switch and the electromagnetic valve 39 is costly and inconvenient. The mode must be selected by the control levers 24 and 29 provided in the automatic air conditioner control 23. This requires control under visual supervision, but this is not preferred in view of safety while driving the vehicle.

SUMMARY OF THE INVENTION

The present invention is to mitigate the aforementioned inconveniences of the prior art systems. The invention has as its object to realize a control system of a vehicle mounted air conditioner comprising a controlling circuit for controlling vacuum systems and vacuum switches being selected and controlled by push-button switches provided separately for each of the modes as the mode selecting means, wherein the vacuum system controlling circuit comprises a negative pressure supplying circuit without a vacuum evacuation system, and only by said uni-directional vacuum signal the blower outlets and air intake inlets are selectively controlled.

DESCRIPTION OF THE DRAWINGS

FIG. 5 is a perspective view for showing an automatic air conditioner controller used in the system of the present invention;

FIG. 6 is an explanatory circuit diagram of the controlling system of the present invention when the push-button switches are in OFF condition; and FIG. 7 is an explanatory circuit diagram of the air conditioner of the present invention when the push-buttons are in OFF condition.

DESCRIPTION OF THE PREFERRED EMBODIMENT

The invention will now be explained by referring to the accompanying drawings.

Figure 1:
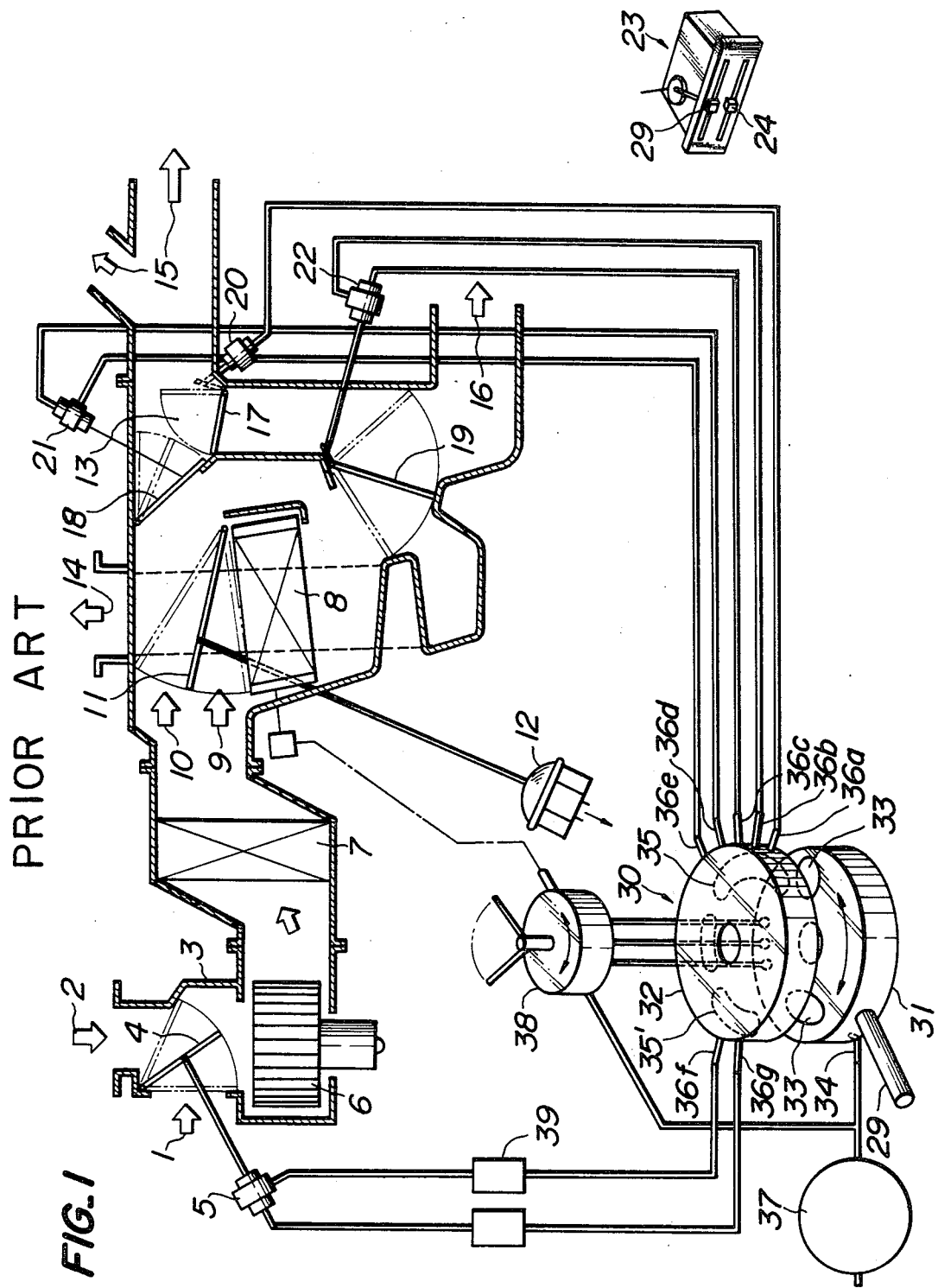
FIG. 1 shows diagrammatically a conventional automatic controlling device of a vehicle mounted air conditioner, which had been explained in the above.
Figure 2:
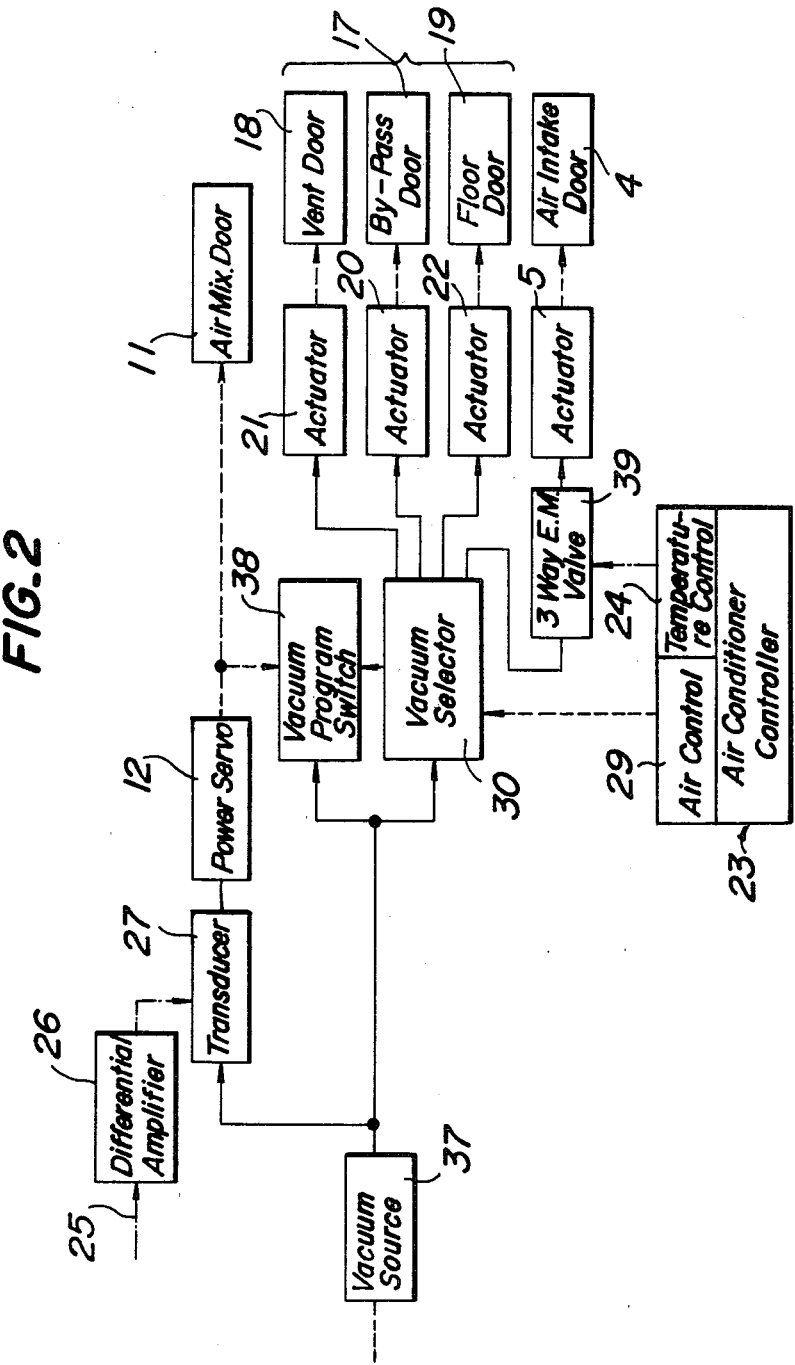
FIG. 2 is a block diagram of the device of FIG. 1, which also had been explained in the foregoing.
Figure 3:
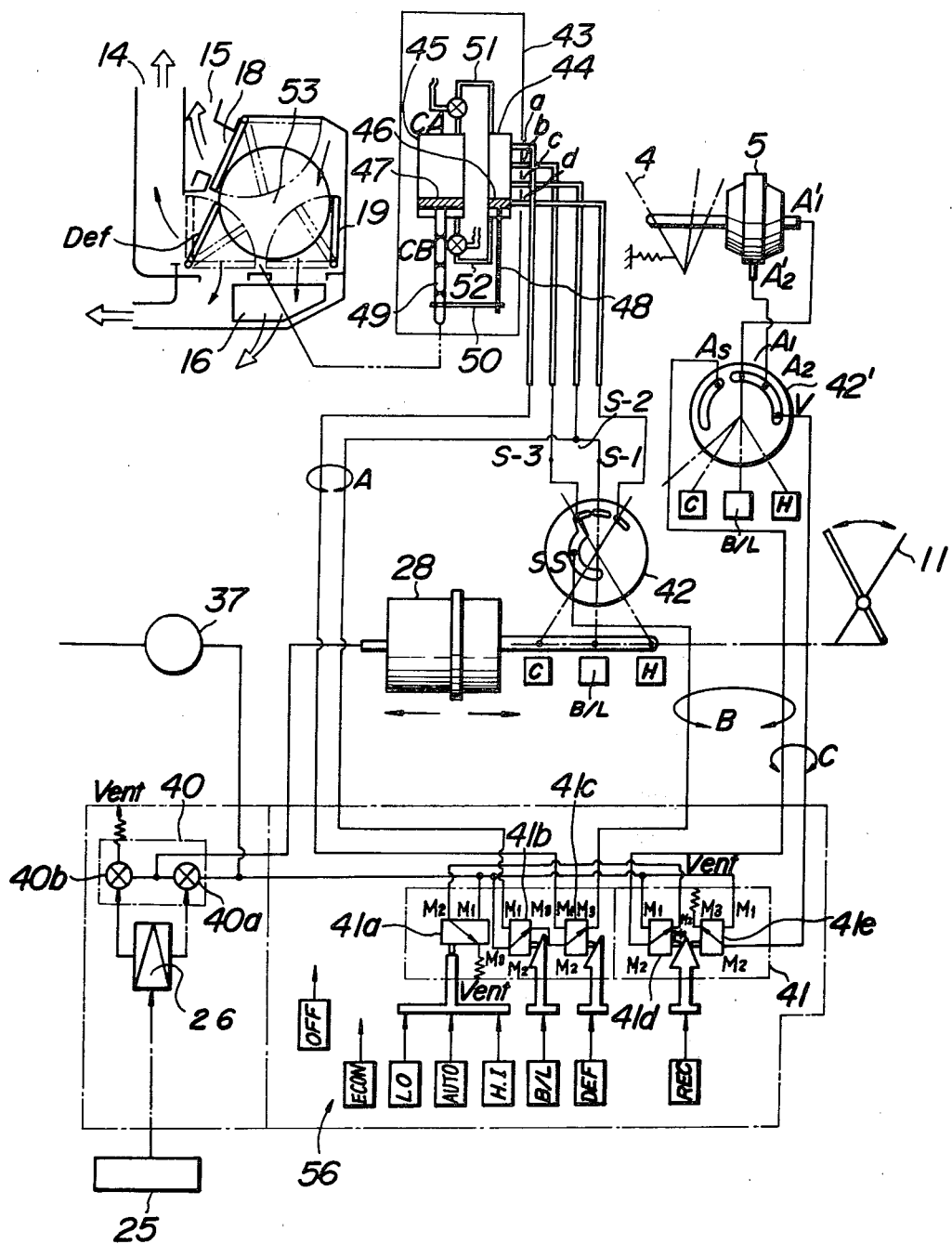
FIG. 3 is a circuit diagram for showing the controlling system of a vehicle mounted air conditioner according to the present invention.
Figure 4:
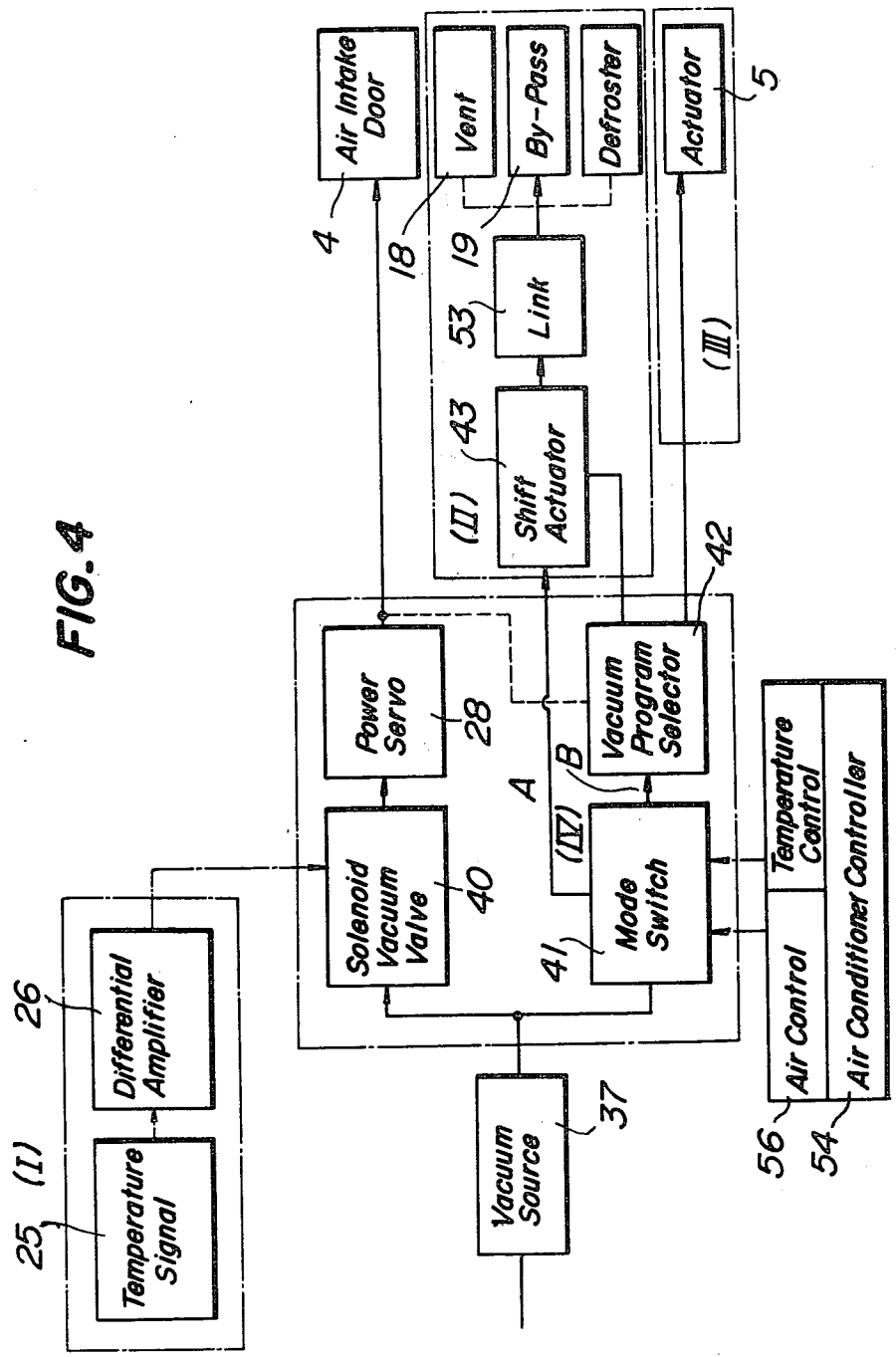
FIG. 4 is a block diagram of FIG. 3.

In the system of the present invention, the selection of the air blower outlet and the air intake inlets for introducing outer air or cabin air is made either manually or automatically under the control program of the automatic temperature adjusting. FIGS. 3 to 5 show schematic circuit diagrams of the vacuum controlling circuit. Reference numeral 37 designates a vacuum source or a negative pressure source being fed from the engine intake manifold or the like. One piping system leading from the vacuum source 37 is coupled to one solenoid vacuum valve 40a of a double solenoid vacuum valve 40 and the other solenoid vacuum valve 40b of the same is coupled to VENT. In parallel to a piping system leading from the vacuum source 37 towards the vacuum mode switch 41, a piping system reaching to a communicating port M₁ of a vacuum mode switch 41e for recirculation (REC), a piping system reaching to a communicating port M₁ of a vacuum mode switch 41d for recirculation (REC), a piping system reaching to a communicating port M₂ of a vacuum mode switch 41b for bi-level (B/L), and a piping system reaching to a communicating port M₁ of a vacuum mode switch 41a for auto (LO, AUTO, HI) are connected. The communicating port M₁ of the vacuum mode switch 41b for bi-level is connected to a passageway S-2 of the vacuum program selector 42 and to a tap c of a shift actuator 43. A communicating port M₃ of the vacuum mode switch 41b for bi-level and a communicating port M₂ of the vacuum mode switch 41c for defroster (DEF) together form a series circuit of a normally closed valve chamber. The communicating port M₃ of the vacuum mode switch 41c for defroster is connected to a passageway SS of the vacuum program selector 42 and the communicating port M₁ of the vacuum mode switch 41c for defroster is connected to a tap a of the shift actuator 43. A communicating port M₂ of the vacuum mode switch 41d for recirculation is connected to a passageway $A_S$ of the vacuum program selector 42' and its communicating port M₃ is connected to a communicating port M₂ of the vacuum mode switch 41a for AUTO. A communicating port M₃ of the vacuum mode switch 41e for recirculation is coupled to the open air and its communicating port M₂ is connected to a passageway V of the vacuum program selector 42'.

This vacuum program selector 42' further comprises two passageways A₁ and A₂. The passageway A₁ of the vacuum program selector 42', provided for driving the air intake door 4, is connected to a tap A₁' of the air intake actuator door 5 and the other passageway A₂ of the vacuum program selector 42' is connected to a tap A₂' of the air intake door actuator 5. A passageway S-1 of the vacuum program selector 42, provided for driving the shift actuator 43, is connected to a tap d of the shift actuator 43 and its passageway S-3 is connected to a tap b of the shift actuator 43.

The shift actuator 43 comprises a distributor cylinder 44, a main vacuum cylinder 45 and pistons 46 and 47 arranged slidably in the above cylinders 44 and 45 respectively. The pistons 46 and 47 are arranged to cooperate together by mechanically coupling the base ends of the respective piston rods 48 and 49 by a connecting plate 50. The distributor cylinder 44 is provided with supply taps a, b, c and d having supply holes opened therein for determining the stopping position of the piston 46. The upper ends and the bottom ends of said distributor cylinder 44 and of said main vacuum cylinder 45 are connected through passageways 51 and 52 respectively. In said passageways 51 and 52, open air releasing valves CA and CB are interposed, respectively. When the vacuum is supplied to the tap position a of the distributor cylinder 44 from the vacuum source 37 either through the automatic selection circuit A or through the manual selection circuit B, the vacuum is also supplied to the main vacuum cylinder 45 through the passageway 51 so that the pistons 46 and 47 are driven by the vacuum to move towards the position of the tap a. The piston rods 48 and 49 follow said movement of the pistons, and thus the piston rod 49 moves to a first step α shown in FIG. 6. In this case, the open air releasing valve CB inserted in the passageway 52 connected between the bottom ends of the cylinders 44 and 45 is arranged to be in a condition to communicate with the open air, whereas the open air releasing valve CA inserted in the passageway 51 connecting the upper ends of the cylinders is arranged to be in a condition to interrupt the introduction of the open air pressure. When the piston 46 of the distributor cylinder 44 arrives at the position of the tap a, this tap a is closed by the piston 46 to interrupt the supply of the negative pressure through this supply tap a. In this case, the open air releasing valve CA communicates to the open air so that the pressure in the inner portions of the cylinders 44 and 45 at the side of said open air releasing valve CA becomes equal to the pressure of the inner portions of the same located at the side of the open air releasing valve CB, and the pistons 45 and 46 stop at the position of the tap a and the piston rod 49 also stops at the first step designated by α.

When the vacuum is supplied to the position of tap c of the distributor cylinder 44, this vacuum pressure is also supplied to the main vacuum cylinder 45 via the passageway 52 so that the pistons 46 and 47 are pulled towards the position of the tap c by the suction force, and the piston rods 48 and 49 coupled therewith also move to the corresponding position. In this condition, the open air releasing valve CA is in the open air pressure communicating condition, whereas the other open air releasing valve CB is in interrupting condition. When the piston 46 of the distributor cylinder 44 comes to the position of the tap c, said tap c is closed by the piston 46 and the open air releasing valve CB is in open air communicating condition so that the pistons 46 and 47 stop at the position of the tap c and the piston rod 49 also stands still at the third step γ. When the vacuum is supplied at the position of the tap d, the operation is nearly the same as the aforementioned case of tap c and the piston rod 49 stops on the fourth step δ. Further, when the vacuum pressure is supplied to the position of the tap b, the operation is nearly the same as in the case of tap a and the piston rod 49 stops on the second step β. By the above-mentioned displacement of the piston rod 49 between the first step α to the fourth step δ, the link 53 coupled thereto follows the displacement to control the floor door 19, the defroster door Def, and the ventilator door 18 among the positions of open, half open, and closed.

FIG. 4 shows the vacuum controlling system of the present invention in block diagram, in which (I) designates the automatic temperature controlling system, (II) designates the blower outlet controlling system, (III) designates the controlling system for the outer air and cabin air intake port, and (IV) designates the selectively controlling system of the mode program. In the construction of the system briefly shown in the diagram, the blower outlet controlling system formed of a vacuum control signal transmission system comprises two transmission systems (FIG. 6), i.e. a manual selecting circuit A leading from the vacuum mode switch 41 in the mode program selectively controlling system (IV) directly to the shift actuator 43, which is the door actuating means, and an automatically selectively controlling system leading from the same vacuum mode switch 41 to the shift actuator 43 via the vacuum program selector 42, which is controlled in response to the operation of the power servo 28. This vacuum signalling system is formed of a uni-directional negative pressure signal supply having no exhaust system for the negative pressure. Concerning the controlling system (IV) for the outer air and the cabin air intake port, the vacuum mode switch 41 in the mode program selectively controlling system controls both for the manual selecting system and the automatic selecting system. The vacuum control signal for this effect is delivered from the vacuum mode switch 41 to the intake door actuator 5 through the automatic selecting circuit B and the vacuum program selector 42'. Only this intake door actuator 5 is the same construction as the conventional system, and it requires a vacuum evacuation system, so that the exhausting system is formed by an outer air and cabin air intake circuit C (FIG. 3).

As can be seen from FIG. 5, almost all of the automatic air conditioner controller 54 mounted at lower side of the instrument panel can be controlled by the push-buttons 56 except the temperature control lever 55. This automatic air conditioner controller 54 houses the aforementioned vacuum mode switch 41 and an electric switch (not shown) for controlling the amount of outlet air from the blower inside thereof.

FIG. 6 illustrates a controlling system for the mode selection of the air blower outlets. This system comprises an automatic selecting circuit B for controlling the doors 18, 19 and Def shown in FIG. 3 based on the automatic temperature control system, and a manual selecting circuit A being selected by depressing the push-button 56. In this vacuum circuit, if the push-button switch 56h for turning off the push-buttons 56 of the automatic air conditioner 54 shown in FIG. 5 is depressed, the vacuum supplied from the negative pressure source 37 is fed to the vacuum program selector 42 via ports $S_0$ and $S_1$ of the vacuum mode switch 41b for bi-level which communicate with each other when the switch 41b is closed to the ports $S_2$ and $S_3$ of the vacuum mode switch 41c which communicate in series when the switch 41c is closed, and to the automatic selecting circuit B. The vacuum is further fed to the shift actuator 43 via a flow route in the vacuum program selector 42 decided by the movement of the vacuum servo 28. In this condition, if either the push-button switch 56c for bi-level or the push-button switch 56b for defroster is depressed, the vacuum controlling system is switched to the manual selecting system since one of the push-button switches 56c or 56b is in the ON condition. By this switching, the vacuum supply from the negative pressure source 37 is fed, for instance, to the tap a of the distributor cylinder when the push-button switch 56b for defroster is depressed and to tap c of the distributor cylinder 44 when the push-button switch 56c for bi-level is depressed. When this push-button switch 56c for bi-level is turned on, the vacuum is supplied to the tap c and also to the main vacuum cylinder 45, so that the pistons 46 and 47 are pulled towards the position of the tap c and the piston rods 48 and 49 move in response to said displacement of the pistons. At the third position γ, the cooperating link 53 (FIG. 3) controls opening, half opening, and closing of the doors 18, 19 and Def, and the adjusted air is blown out from the ventilator blower outlet 15 and the floor blower outlet 16 into the cabin. This vacuum circuit is essentially formed of the automatic selecting circuit B, which is a series circuit of uni-directional vacuum signal circuits provided with a route bypassing the manual selecting circuit A. The system is arranged to be able to change into the manual selecting circuit A from the automatic selecting circuit B by depressing the push-button 56c or 56b for selecting the mode.

The controlling system for the air inlet port introducing the outer air or recirculating the cabin air will be explained by referring to FIG. 7. At a time when both the automatic selecting circuit B and the manual selecting circuit A are in the OFF condition, the vacuum supply from the negative pressure source 37 is interrupted at a port $A_{S0}$ of the vacuum mode switch 41a for the automatic circuit. Further this vacuum supply is interrupted at a port $A_{S0}$ of the one vacuum mode switch 41d for recirculation and also at a port Asp of the other vacuum mode switch 41e for recirculation so that the vacuum does not appear at the intake air door actuator 5 and the air intake door 4 is fixed at a condition to introduce the outer air. From this condition, if the push-button switch 56e for automatic control is depressed, the vacuum from the negative pressure source 37 is fed to a port AsA of the vacuum program selector 42' through the ports $A_{S0}$ and $A_{S1}$ of the vacuum mode switch 41a. Then the vacuum is supplied to the intake door actuator 5 in response to the movement of the power servo 28 and moves the air intake door 4. When the push-button switch 56a for recirculation is depressed to put the vacuum mode switches 41d and 41e for recirculation in the ON condition, the vacuum is supplied to the port AsA of the vacuum program selector 42' through the port $A_{S0}$ and $A_{S3}$ of the vacuum mode switch 41d for recirculation and is further supplied to a port $V_2$ of said vacuum program selector 42' through the ports Asp and $V_1$ of the vacuum mode switch 41e for recirculation. By the vacuum supply through the two routes, the ports $A_1$ and $A_2$ of the vacuum program selector 42' are fed with the vacuum, which deliver it to the intake air actuator 5 to actuate it to bring the air intake door 4 to a position to introduce cabin air and fix it at said position.

The controlling system of the vehicle mounted air conditioner according to the present invention has substantially the aforementioned condition and it has the advantage of a simplified vacuum controlling signal circuit in its mode selection. The selecting circuit is formed only by a uni-directional negative pressure supply and is able to eliminate the need for the provision of the conventional exhaust circuit in a return circuit which is characteristic of the equivalent signalling system of the conventional bi-directional system, which provides for the supply of negative pressure in one way and the exhaust of the same in the other way. The unidirectional negative pressure supply contributes greatly to the simplification of the construction. Namely, the provision of the individual actuator for each of the ventilator door, the floor door, the defroster door or the like can be dispensed with.

In the conventional system, an electromagnetic valve for fixing the air intake port at the cabin air recirculation position has been used. However, in the present invention, since the task of the electromagnetic valve may be taken by the vacuum signalling system and the vacuum mode switch to fix the door in the cabin air recirculating condition, the electric circuit and the electromagnetic valve can be removed.

As has been explained in the foregoing, the vacuum signalling system of the present invention is very simple and, accordingly, the piping length can be decreased and hence the installation cost can also be decreased.

At the mode selection, the manual selecting system and the automatic selection system are separated from each other as far as possible. In other words, the signal circuits are formed to accommodate the circuits having the same controlling object in one system as far as possible. The vacuum signalling system can also be formed the selecting system only by uni-directional vacuum signal so that the number of the negative pressure circuits can greatly be decreased so that the vacuum control signalling system is unified and simplified. This will result in a simple piping system. Hence, the assembling can be made with high efficiency, and lower cost of the overall system can be expected.

Selection of the all of the modes can be done merely by the depression of the push-buttons, so that there is no need to make visual check every time, and an easy selection of the objective mode can be realized. This will contribute to the safe driving of the vehicle.

Although a typical embodiment has been explained as an embodiment of the present invention, various modification thereof will be possible without departing the scope of the invention as defined in the appended claims.

What is claimed is:

1. A system for automatically controlling a vehicle mounted air conditioner having an air intake port for introducing outer air, cabin air or a mixture thereof, an air intake door controlling the source and mixture of the intake air, and a vacuum-operated air intake door actuator, a hot air passage, a cold air passage, an air mix door controlling the proportions of the intake air passing through the hot air passage and the cold air passage, and an air mixing door actuator, a plurality of blower outlets for conditioned air and a blower outlet door for each of said blower outlets, in which the flow of conditioned air through the outlets is in response to a controlling program of an automatic temperature adjusting system in either an automatic selection mode or a manual selection mode, wherein the improvement is characterized in that the system comprises a mode controlling vacuum switch for placing the system in either the automatic selection mode or the manual selection mode, a controlling vacuum circuit system controlled by said vacuum switch for supplying a uni-directional vacuum signal and including said air intake door actuator, a shift actuator for actuating said blower outlet doors, and vacuum selectors for transmitting the vacuum signal from said vacuum switch to the shift actuator and the air intake door actuator, said vacuum selectors being controlled by a temperature-responsive power servo.

2. The system of claim 1 wherein the shift actuator includes a distributor cylinder and a main vacuum cylinder having respective pistons slidably mounted therein and mechanically coupled together, and means associated with the vacuum circuit system for moving the piston in the distributor cylinder to various selected positions, thereby controlling the position of the piston in the main vacuum cylinder.

3. The system of claim 1, wherein the mode controlling vacuum switch comprises a vacuum mode switch for placing the system in the automatic selection mode and vacuum mode switches for placing the system in the manual selection mode, a vacuum source in communication with the vacuum selector for transmitting the vacuum signal to the shift actuator, when the vacuum mode switches for the manual selection mode are in a non-operating condition, and said communication of the vacuum signal is interrupted when said vacuum mode switches for the manual selection mode are in an operating condition and the vacuum source is directly coupled to the shift actuator.

4. The system of claim 1, wherein the mode controlling vacuum switch is selected and controlled by push-button switches provided individually for each of the modes.

* * * * *